US005767790A

United States Patent [19]
Jovellana

[11] Patent Number: 5,767,790
[45] Date of Patent: Jun. 16, 1998

[54] AUTOMATIC UTILITY METER MONITOR

[76] Inventor: Bartolome D. Jovellana, 16737 Mulvane St., Valinda, Calif. 91744

[21] Appl. No.: 612,440

[22] Filed: Mar. 7, 1996

[51] Int. Cl.⁶ .................................................. G08B 23/00
[52] U.S. Cl. ............................. 340/870.02; 340/870.29
[58] Field of Search ......................... 340/870.02, 870.03, 340/870.28, 870.29; 364/483, 492, 493

[56] References Cited

U.S. PATENT DOCUMENTS

| | | | |
|---|---|---|---|
| 4,147,983 | 4/1979 | Benbow et al. | 324/103 R |
| 4,264,897 | 4/1981 | Farnsworth | 340/870.29 |
| 4,688,038 | 8/1987 | Giammarse | 340/870.02 |
| 4,804,957 | 2/1989 | Selph et al. | 340/870.03 |
| 5,014,213 | 5/1991 | Edwards et al. | 340/870.02 |

*Primary Examiner*—Jeffery Hofsass
*Assistant Examiner*—Andrew Hill
*Attorney, Agent, or Firm*—Boniard I. Brown

[57] ABSTRACT

A self-contained automated meter reader system for monitoring a plurality of channels for gas, electricity and water utilities, has additional channels dedicated to normally closed alarm signals for monitoring the integrity of the system. The system is installed at the site of a standard utility meter and is configured for monitoring and operation by a user via keyword command programming on a data terminal or personal computer. Externally entered programming communicates with a compiler in the automated meter reader unit. Pulse data is accepted from digital meter reader devices for gas and water systems and a photoelectric sensor reads the watt-hour electricity usage. Utility office communication is via telephone modem link to a computer and a lap-top computer for field setup and systems analysis. Computing electronics hardware is within the watt-hour meter housing and interfaces with utility service meters. DC power supply and telephone service through a connector on a weatherproof polycarbonate meter enclosure on a utility electric service box.

7 Claims, 4 Drawing Sheets

1

AUTOMATIC UTILITY METER MONITOR

BACKGROUND OF THE INVENTION

Field of the Invention

The present invention relates generally to utility usage measurement systems, and more particularly to means for obtaining periodic readings of utility meters without the need for a personal meter reader to physically appear and read a meter periodically. A device according to the invention can totalize pulse signals from utility meters and remotely monitor system integrity status.

Utility companies conventionally obtain periodic readings of utility meters by meter readers visiting each location to physically read the meters. An average of about $0.60 to $0.80 is the cost of each reading, depending on area and geographic location. In the U.S., the cost is about $864 million dollars to $1.152 billion annually to read electric meters. A comparable amount is involved in reading gas meters or water meters. The cumulative total for reading utility meters is about $2.6 to $3.45 billion annually. A number of utility companies have utilized automatic meter reading systems using wireless technology and 900 MHz radio transmitters. A meter can be read while riding in a vehicle while using a hand-held transceiver. A similar system may employ a Cellnet data system employing cellular phone technology.

In the prior art, U.S. Pat. No. 4,804,957 to Selph et. al. discloses a utility meter and submetering system which is a microprocessor-based circuit using Hall Effect electric current sensors to measure power usage by customers. The microprocessor determines time of use information which is stored in random access memory, which may be remotely interrogated via a telephone line or serial communications link to effect a submetering configuration useful in apartment complexes and the like wherein a multiplicity of meters are multiplexed by a data collection computer, which is networked with other data collection computers to a central billing computer.

U.S. Pat. No. 4,688,038 to Giammarese relates to a device for relaying the remote reading of a utility meter having circular dials, and includes an array of phototransistors for each circular dial of the utility meter. The face of the dial is illuminated selectively, when a reading of the dial is desired, by a light-emitting diode at the center of the array of phototransistors. The phototransistor which is shaded by a dial pointer indicates the highest value of the reading by the pointer, develops a signal indicative of the reading, which is output to a logic circuit for the development of the signal into usable form for generating the value at a remote display device on the outside of a building. Alternatively, the output from the logic circuit may be sent over a telephone transmission line to a remote computer center for storage and retrieval for billing customers.

The prior art shows specific methods for reading meters, particularly dial indicator meters (such as gas meters) and some basic microprocessor based connection to a telephone line. However, the prior art does not present a practical, interactive data processing configuration that is required for monitoring the status of the service installation at any time to insure the integrity of the system and the accuracy of meter readings, nor does it teach the use of a photoelectric sensor for reading a watt-hour meter. The prior art does not teach the combination of a photoelectric watt hour meter with a pulse electric meter, such as a gas meter, and a water meter which are totalized and stored in an EEPROM data buffer or the like for further computation of status, records keeping, and billing.

SUMMARY OF THE INVENTION

In accordance with the invention, a self-contained microprocessor controlled system capable of monitoring a plurality of channels (gas, electricity and water) has a plurality of additional channels dedicated to normally closed alarm signals for monitoring the integrity of the system at all times. The automated meter reader (AMR) system device is installed at the site of the standard utility meter and configured for monitoring operation of the system by the utility via keyword command programming on a data terminal or personal computer. The system enables a utility company to selectively communicate by password with any home or industrial utility installation. Externally entered C programming is used to communicate with a C compiler resident in the automated meter reader (AMR) unit.

The device accepts pulse data from prior art digital meter reader devices for gas and water systems, and utilizes a photoelectric sensor for reading the watt-hour indicator of electricity service usage. Communication with the utility office is via telephone modem link to a computer, and by a lap-top computer, such as an RS232 for field setup and analysis of the system.

For electric meter pulse signals, a pulse divider is provided to produce a reading—i.e., a certain number of pulses equal to a counter reading, which depends on the type and model of the electric meters. For gas and water meters, pulses are direct counter reading. The system is capable of direct connection to a standard two-wire telephone. Thus the invention presents a practical and complete solution to the problem.

DESCRIPTION OF THE PREFERRED EMBODIMENT

Figure 1:
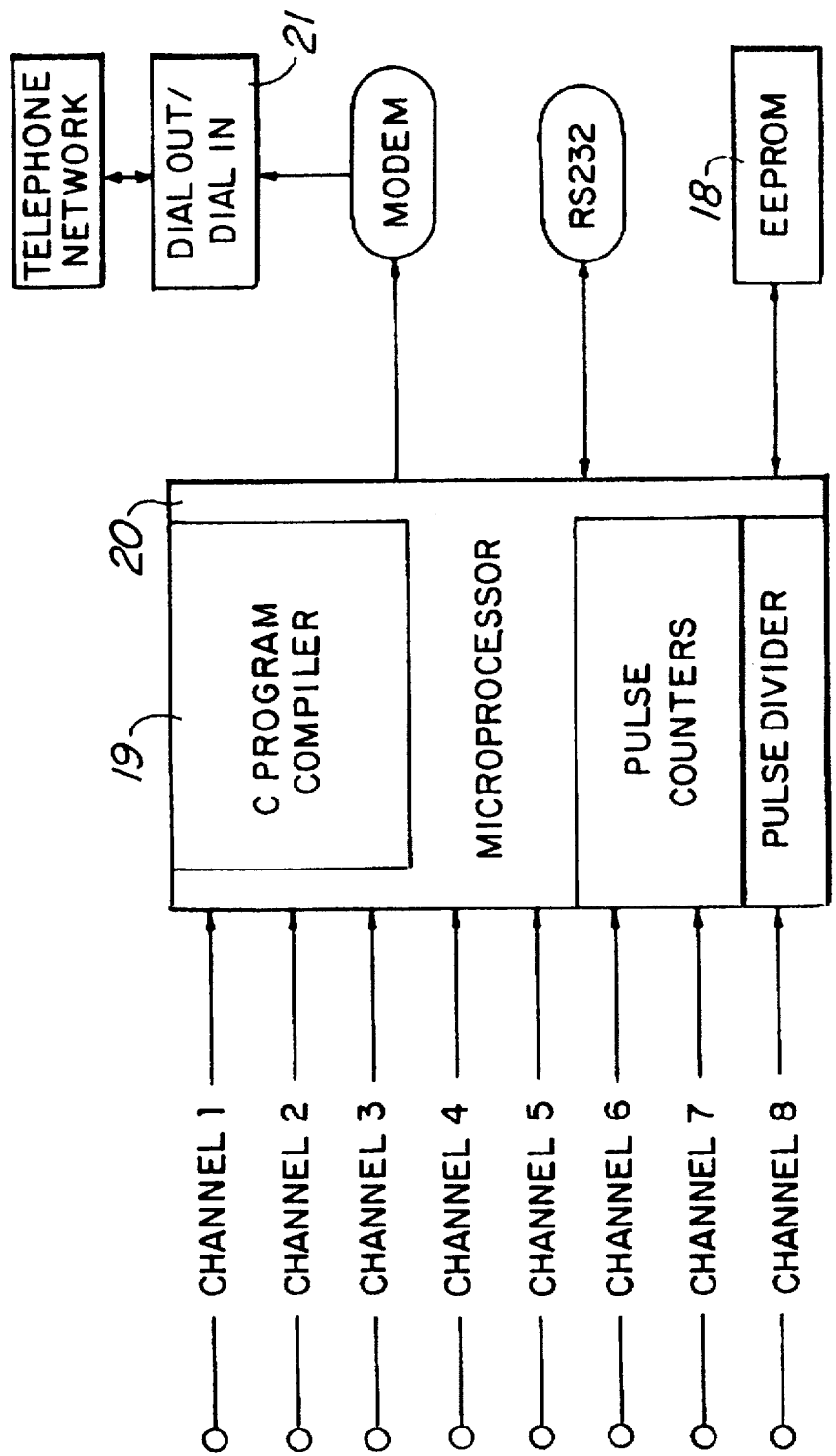
FIG. 1 is a functional flow diagram illustrating the method of the system of the invention.

Referring to the drawings, FIG. 1 shows an automated meter reader (AMR) invention, as including a self-contained microprocessor based control system capable of monitoring eight channels, inputs 1 through 8. The input channels comprise three pulse channels and five normally closed alarm channels, as shown. The system is integrated on a circuit board 20 (FIG. 4) mounted in the electric meter housing, and is installed and configured for operation via key word command programming via a modem communicating with a data terminal or PC (not shown). The AMR has an internal resident compiler 19 to interpret the C-programming language. However, programming is not necessary for normal operation of the system, programming for normal operation being self-contained in the AMR.

The system provides an internal modem connection for communication with the outside utility as well as an RS 232 serial port for lap-top access, and is provided with an automated dial-out/dial-in function for periodic and emergency data reporting. Access to AMR is through a secret AMR identification number. The unit 10 (FIG. 2) is designed for direct connection to any utility telephone network.

Three pulse channels serve to receive pulse signals from domestic electric, gas and water meters. The pulse signals are totalized and stored in an EEPROM data buffer. One alarm channel 7 (FIG. 1) is used for a magnetic switch attached to the door of the AMR enclosure to activate an alarm when the AMR is tampered with or accessed illegally. The alarm may be overridden by the insertion of an RS 232 cable into serial port 15 during servicing or repair work on the AMR, after a one-minute delay. Three alarm channels 4, 5, 6 (FIG. 1) are provided to indicate loss of pulse signals from the meter pulse transmitter, and an alarm channel 8 is provided to indicate loss of AC power supply to the unit. Serial pulses from an electric meter, a gas meter, and a water meter are received, totalized and stored in the EEPROM data buffer. For electric meter pulse signals, a pulse divider is provided to produce a reading—i.e., a certain number of pulses equal to a counter reading, depending on the type and model of the utility meter. For gas and water meters, the pulses are direct counter readings. The AMR is capable of connection to a standard two-wire telephone using pulse or tone with loop start only. The AMR recognizes ringer frequencies from 10 to 60 Hz. The AMR is provided with a built-in 300/2400 bps modem with a two-wire telephone connection, and an RS 232 serial communications port for communications. The AMR is provided with an auto-dial circuitry to auto-dial up to eight telephone numbers, each 32 digits long, during an alarm condition. Individual dial-out alarm selection may be programmed for each input channel to instruct the AMR to dial specific telephone numbers for certain alarms. In case an alarm is detected, the AMR will continue to call telephone numbers in succession until a positive acknowledgement of the alarm message is received. Acknowledgement is accomplished by a PC terminal. A circuit is provided to enable the AMR to wait for dial tones before dialing a number. Call detection insures that the alarm dial-out is not hindered by no-answers or busy signals.

A circuit is provided to automatically pick up telephone inquiry calls using coded handshake signals, but hangs up if a third party pickup is sensed. The AMR is programmed to auto-dial a telephone number periodically for up to six telephone numbers to report meter input status.

Figure 2:
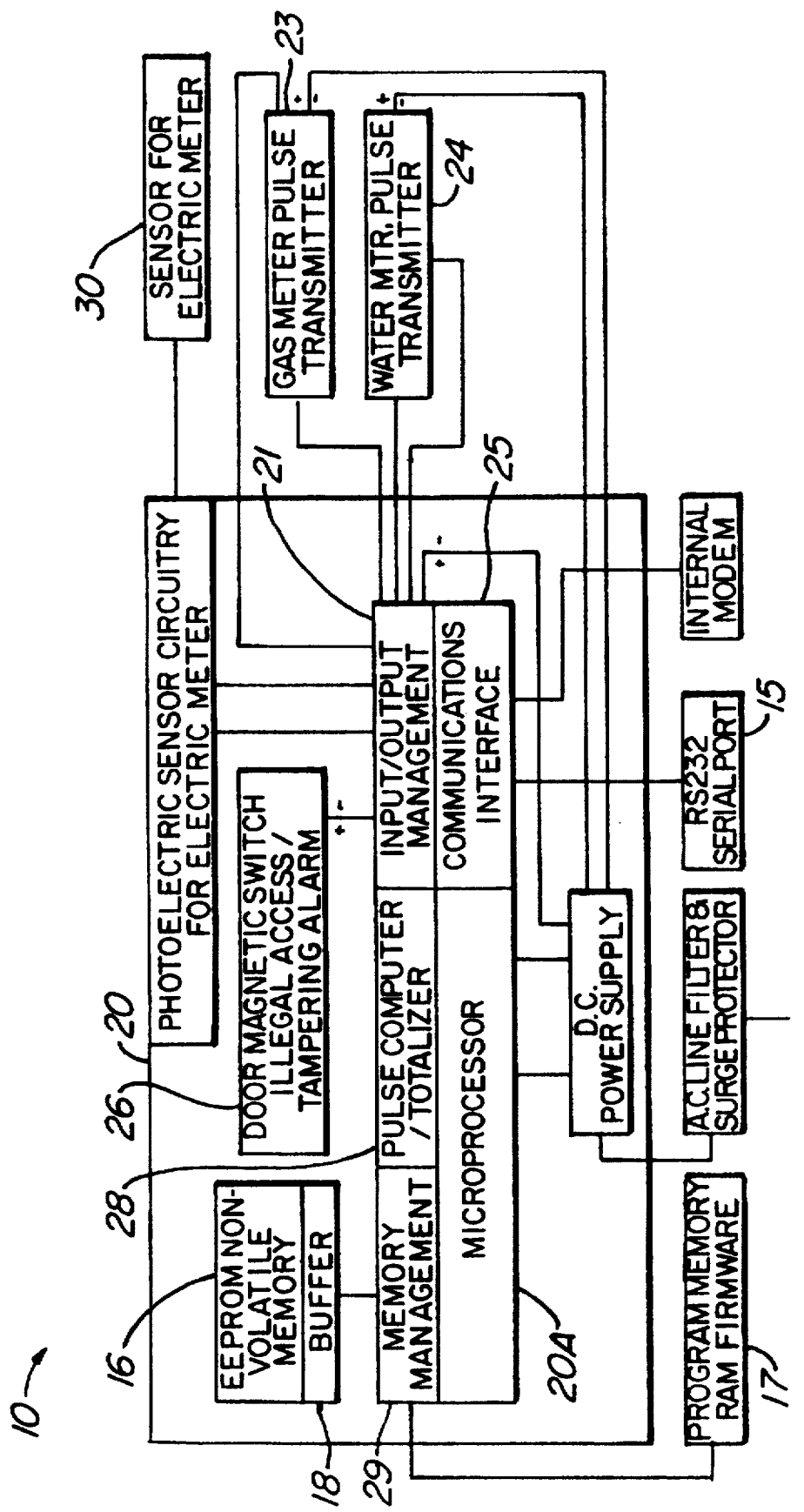
FIG. 2 is a block diagram of an automatic meter reader system according to the invention.

Referring to FIG. 1 and circuit board 20, and to FIG. 2, a memory with a 96K non-volatile EEPROM 16 and 64K RAM 17 to store all resident programs and AMR information, are provided. The AMR board 20 includes a C-compiler 19 to make it possible to write custom programs. The AMR can log and store the status of each input with a time stamp. The data is stored into the EEPROM data buffer 18. When the data buffer in the input/output management section 21 is full, the logger overrides the oldest data and adds the most recent. Time is kept by an on-board real-time clock which has its own battery backup. The time between logs can be programmed into any number of hours, minutes, and seconds. Historical files are stored in such manner as to be retrievable with a data base or a spread sheet program, using their file import function.

The meter pulse transmitters 23, 24 and 30 (FIG. 2) provide local and remote power failure indication to a memory which stores the number of kilowatt hours of electricity usage, cubic feet of gas, or units of water usage in the microprocessor-associated memories above described. These measurement signals are introduced through the input-output management circuits 21 associated with the microprocessor. The communications interface circuits 25 associated with the microprocessor handle the modem and RS 232 ports to the outside, for utility company use only, and any illegal access or tampering is reported by the AMR to the utility company when the magnetic door switch 26 (FIG. 4) is open. Power failure can also open this magnetic switch, giving the utility company a measure of outages in an area having AMRs installed throughout.

The pulse computer totalizer circuits 28 associated with the microprocessor 20A provide totals in digital form of the final usage values in a designated period, for storage in memory through memory management function 29.

Figure 3:
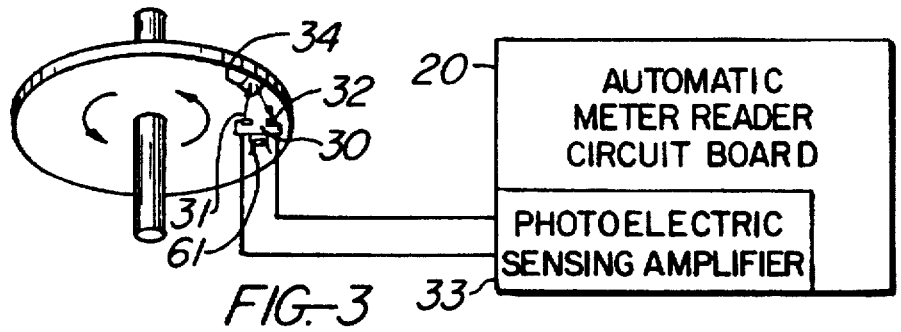
FIG. 3 is a schematic showing of elements of a photoelectric watt-hour meter sensor and reader utilized with the present invention.

Referring to FIG. 3, the photoelectric sensor 30 circuit and mechanism comprising an infrared LED-modulated light source 31, light sensitive phototransistor 32 and amplifier circuit 33, to amplify the reflective signals to turn on or off a relay switch, is provided. The sensor 30 senses the black mark or an aperture 34 at the bottom side of the watt-hour meter disk, against the white background. An infrared light on the bottom surface of the rotating disk in a watt-hour meter is projected as by a diode laser. A watt-hour meter is based on proportional eddy currents induced in the disk to rotate the disk in proportion to the current. The light is reflected by a metallic or white surface of the disk, and is sensed by the light sensitive phototransistor, which may be no more than 50 mm distant, thereby completing a circuit. When the infrared light is projected against the black mark at the bottom of the rotating disk or an aperture in the disk, the light is not reflected from the black mark or aperture. The phototransistor senses no light, thereby cutting off the circuit, opening the relay switch and sending a pulse to indicate a full rotation of the disk. The opening and closing of the switch is sent as a pulse input signal to the AMR to be totalized and stored in the EEPROM.

Figure 4:
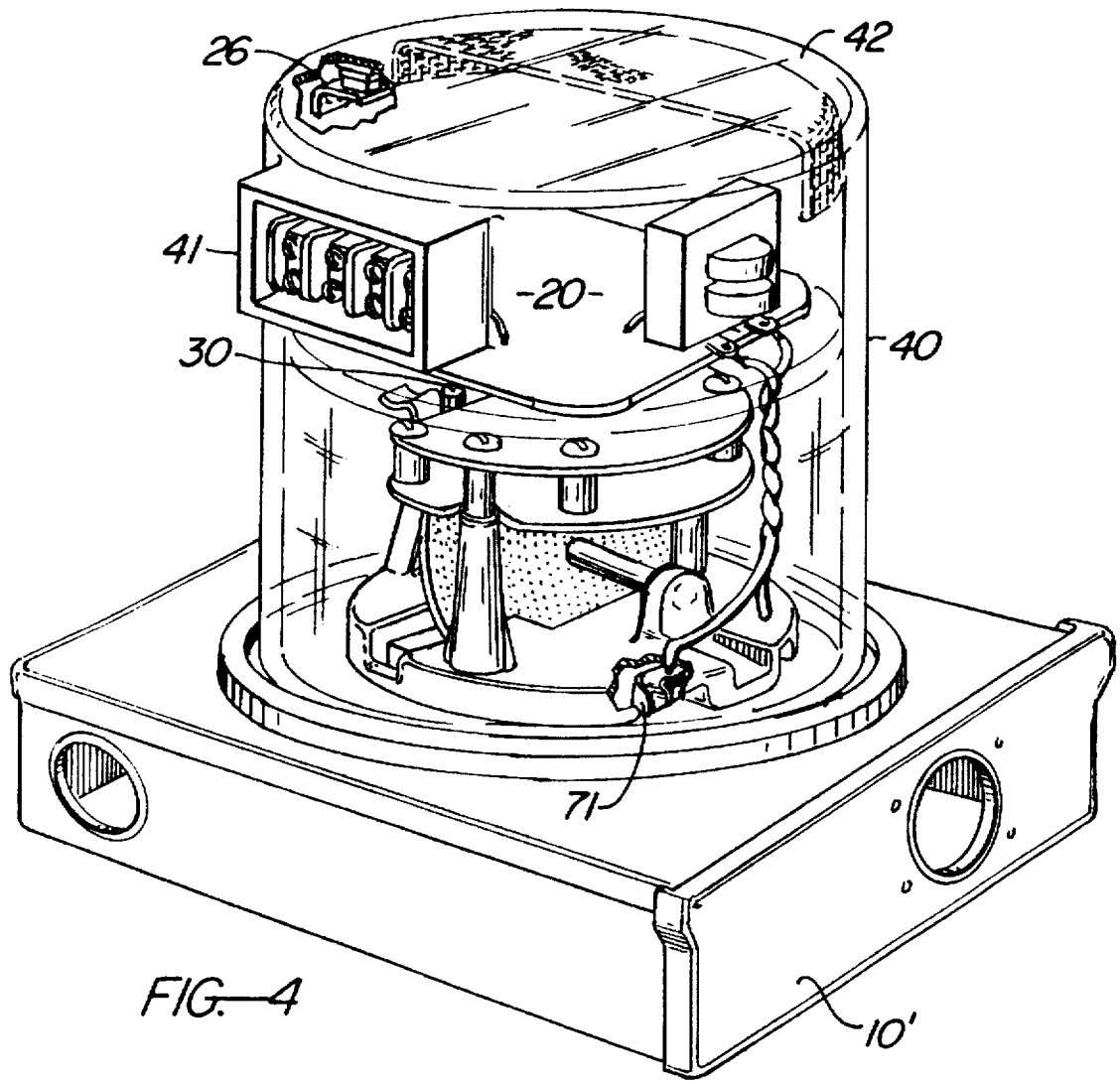
FIG. 4 is a perspective view of an electric utility watt-hour meter in relation to elements of the invention.

FIG. 4 shows an assembled meter reader and monitor in accordance with the invention. An electric utility watt-hour meter illustrates the relative positions, of the elements of the invention to the elements of the standard meter, shown face down and mounted on a chassis in the electrical utility service box 10, with readout control switching circuitry and connection to communications facilities together with other utility service meters. All computing elements of the monitor system are contained within the utility watt-hour meter housing. A polycarbonate cover 40 with a screw-in top 42 encloses the watt-hour meter, replacing the glass cover thereof which may be removed. A system interface circuitry connector 41 for connection to communications facilities and other utility service meters, includes connections for a telephone 2-wire connector, a 220 AC/24 VDC power supply transformer, a terminal connector for a gas meter pulse transmitter, and a terminal connector for water meter pulse transmitter.

The polycarbonate cover makes the automatic utility meter reader and monitor weather proof.

The present invention provides for quick and economical installation. For example, $100 might be involved for a conversion of a standard service meter installation to an automated system. Such cost is justified in view of the annual 30% or more savings over non-automatic meter reading.

Figure 5:
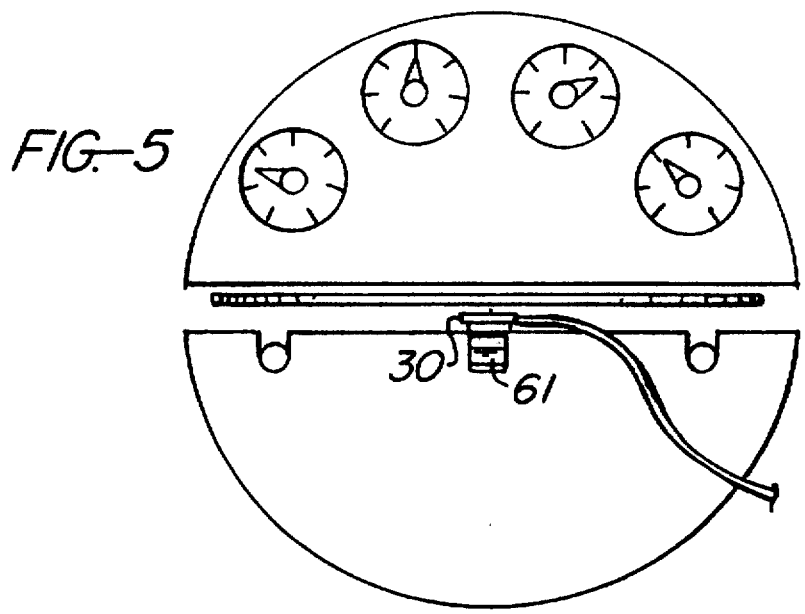
FIG. 5 is a partial elevational view of a watt-hour meter sensor including a clip-on photoelectric device, according to the invention.
Figure 7:
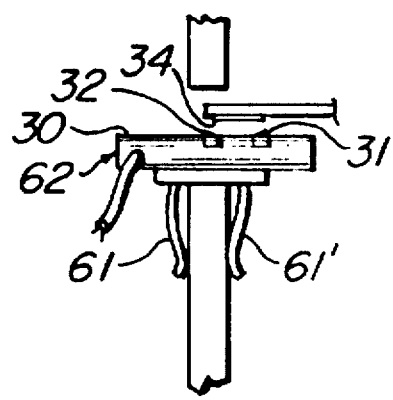
FIG. 7 is a fragmentary view showing a clip-on mounting and connection of sensor circuitry to power service at the meter.

Referring to FIG. 5, there is shown an embodiment of the sensor for the watt-hour meter in the form of a simple clip-on photoelectric device 30, in accordance with the invention. This sensor implementation is shown in FIG. 7, which shows the front and back mounting clips 61, 61, and the position of the light source 31 and phototransistor 32 in block 62.

Figure 6:
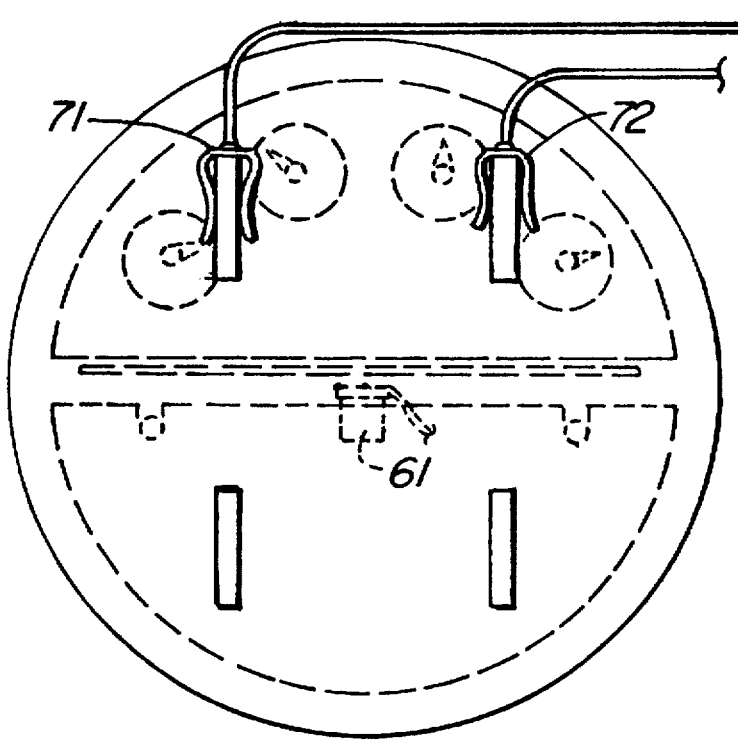
FIG. 6 is a sectional view of the device of FIG. 4, showing a clip-on mounting of the sensor and a light source and phototransistor.

FIG. 6 shows a watt-hour meter electrical service box connection, and the rapid-installation clip-on connectors 71, 72 of the sensor circuitry to the power service at the meter.

Thus there has been shown and described a novel automatic utility meter monitor which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

The inventor claims:

1. An eddy current disk rotation photoelectric sensor comprising:

a photoelectric sensor circuit and mechanism including an infrared LED-modulated light source, said light being emitted by a diode laser, a light sensitive phototransistor, and an amplifier circuit to amplify reflective signals from said disk to operate a relay, and means defining a non-reflective area on a bottom side of the disk interrupting a reflective surface area of the disk, whereby infrared light in a watt-hour meter is reflected by the reflective surface of the disk and sensed by the light sensitive phototransistor until the non-reflective area is encountered to actuate the relay and transmit a pulse.

2. An eddy current disk rotation photoelectric sensor according to claim 1 wherein the sensing distance between the disk surface and the phototransistor is no more than about 50 mm.

3. An eddy current disk rotation photoelectric sensor according to claim 1 wherein the reflective surface of the disk is white.

4. An eddy current disk rotation photoelectric sensor according to claim 1 wherein the reflective surface of the disk is metallic.

5. An eddy current disk rotation photoelectric sensor according to claim 1 wherein the non-reflective mark is an aperture.

6. An eddy current disk rotation photoelectric sensor according to claim 1, and further comprising:

a pulse divider to accumulate pulses from successive rotations of the disk to produce a digital number.

7. An electric power usage measuring instrument for producing a pulsed output, said instrument comprising:

a frame for mounting the instrument, an eddy current disk rotor, said disk rotor having a reflecting surface and a non-reflecting surface interrupting an optical coupling at least every revolution of said disk rotor, means for generating eddy currents in the disk rotor, mounting clip means on the frame and adapted to hold said photoelectric sensor in optically coupled relationship with said disk, photoelectric sensor means comprising a diode laser light source and a phototransistor on the frame and optically coupled to said disk rotor, and memory means to receive pulses from said optical coupling, whereby pulses accumulated in a memory in a predetermined time indicate power usage.

* * * * *